United States Patent [19]

Kito et al.

[11] 3,830,549
[45] Aug. 20, 1974

[54] FLUID PRESSURE CONTROL VALVE APPARATUS FOR DUAL SYSTEM BRAKE

[75] Inventors: Masahiro Kito, Nagoya; Hiroshi Kawaguchi, Toyota, both of Japan

[73] Assignees: Aisin Seiki Kabushiki Kaisha, Kariya-shi, Aichi-ken; Toyota Jidosha Kogyo Kabushiki Kaisha, Toyota-shi, Aichi-ken, both of, Japan

[22] Filed: Nov. 13, 1972

[21] Appl. No.: 305,828

[30] Foreign Application Priority Data
Nov. 18, 1971 Japan............................. 46-92614

[52] U.S. Cl. .................................. 303/6 R, 303/52
[51] Int. Cl. ............................................ B60t 15/06
[58] Field of Search .............. 303/6 C, 6 A, 6 R, 10, 303/50, 52, 53, 54, 40; 188/152, 349

[56] References Cited
UNITED STATES PATENTS

| | | | |
|---|---|---|---|
| 3,265,447 | 8/1966 | Bueler | 303/54 |
| 3,684,330 | 8/1972 | Kito | 303/54 |
| 3,692,367 | 9/1972 | Kuromitsu | 303/10 |
| 3,712,057 | 1/1973 | Aiki et al. | 303/6 C |

*Primary Examiner*—Duane A. Reger
*Assistant Examiner*—D. C. Butler
*Attorney, Agent, or Firm*—Wenderoth, Lind & Ponack

[57] ABSTRACT

The fluid pressure control valve apparatus for a dual system brake has a pair of valves disposed tandem within a valve body, said pair of valves having valve means for communicating or discommunicating between a source of fluid pressure and a wheel cylinder and valve means for communicating or discommunicating a reservoir tank and the wheel cylinder. One of the pair of valves is operable by fluid pressure of the source of fluid pressure when the other of the valves is operated to transmit the fluid pressure into the wheel cylinder related thereto.

11 Claims, 6 Drawing Figures

3,830,549

FLUID PRESSURE CONTROL VALVE APPARATUS FOR DUAL SYSTEM BRAKE

BACKGROUND OF THE INVENTION

This invention relates to a fluid pressure control valve apparatus for a dual system brake, and, more particularly, to such valve apparatus, wherein a pair of valves are disposed in tandem to that, while a brake system is operated by fluid pressure from a source of fluid pressure obtained by opening one of the valves, the other of the valves is opened by the fluid pressure whereby the other brake system is operated by fluid pressure from another source of fluid pressure.

In a control valve apparatus for controlling a power brake, a large slide resistance for operating the valve necessitates a large pedal tread force which is required until the output fluid pressure is actually obtained, causing delay in starting the brake and decreasing the safety of the brake apparatus.

Accordingly, there have been proposed several fluid pressure control valve apparatus for a dual brake system, wherein the internal mechanisms have been improved to reduce the slide resistance at the time of starting. However, these apparatuses have not been entirely satisfactory.

Therefore, the primary object of the present invention is to provide a fluid pressure control valve apparatus for a dual brake system, wherein the operation resistance of the valve apparatus at the initial stage of braking is reduced.

SUMMARY OF THE INVENTION

According to the present invention, the slide resistance of the fluid pressure control valve apparatus for a dual system brake is reduced greatly by making only one of the valves slide within the seat piston at the initial stage of braking operation.

Another object of the present invention is to provide a fluid pressure control valve apparatus for a dual brake system, wherein the slide resistance of the valve apparatus at the initial stage of the braking operation is only the small slide resistance of the poppet valve.

A further object of the present invention is to provide a fluid pressure control valve apparatus for a dual brake system, wherein one of a pair of valves disposed in tandem is operated to cause fluid pressure within a wheel cylinder of a system, the other of the valves is opened by the fluid pressure.

A still further object of the present invention is to provide a fluid pressure control system for a dual brake system including a fluid pressure control valve apparatus as described hereinbefore.

The fluid pressure control for a dual system brake system according to the present invention includes first and second fluid pressure sources, first and second reservoir tanks, a fluid pressure control valve apparatus as described hereinbefore, and first and second wheel cylinders.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
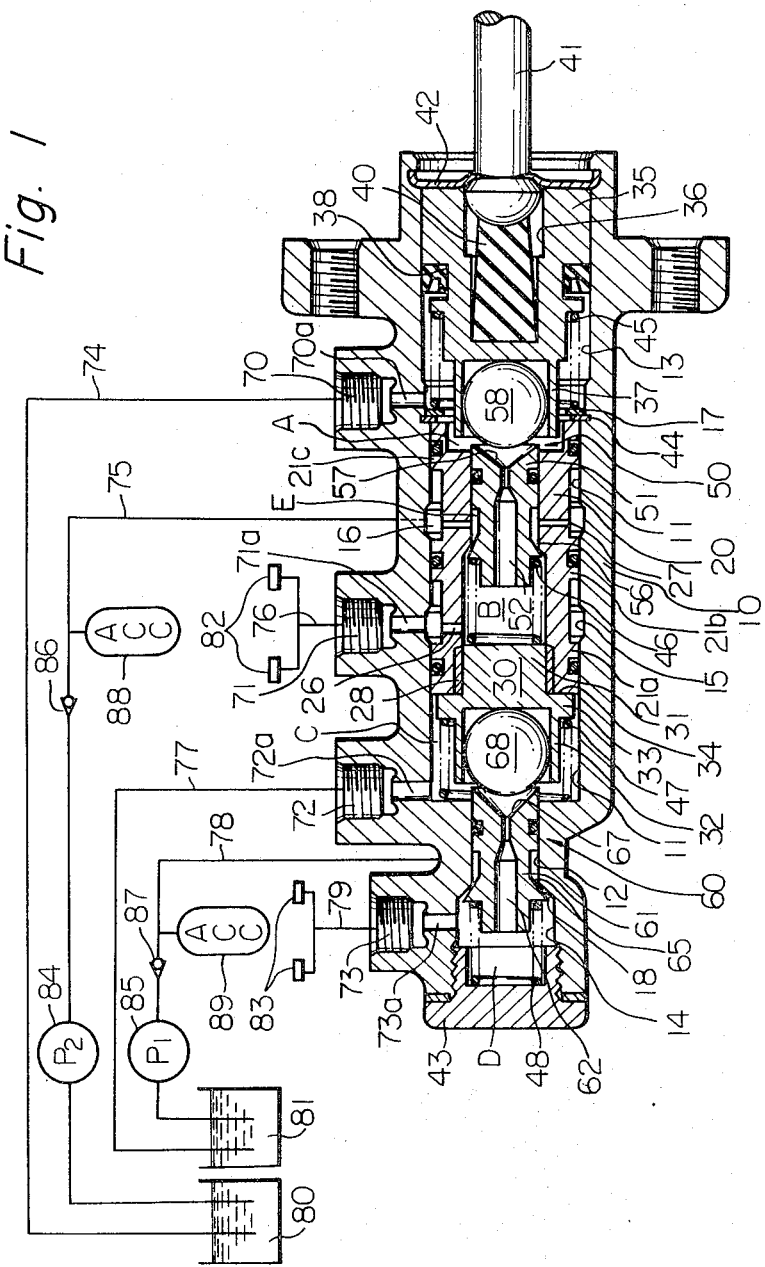
FIG. 1 is a longitudinal sectional view of the first embodiment of the fluid pressure control valve apparatus for a dual system brake according to the present invention.
Figure 2:
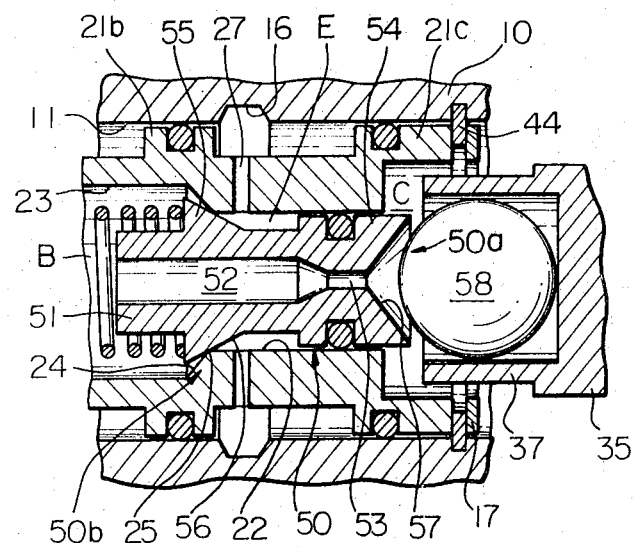
FIG. 2 is an enlarged fragmentary sectional view of the fluid pressure control valve apparatus of FIG. 1 showing the details of the first valve.

In FIG. 1, there is shown a fluid pressure control valve apparatus for a dual system brake according to the present invention having a body 10. The body 10 is provided with a cylinder 11 with a larger diameter and a cylinder 12 with a smaller diameter which is coaxial with the cylinder 11. The body 10 is further provided at the right (in FIG. 1) of the cylinder 11 with a cylinder portion 13 having a diameter somewhat larger than that of the cylinder 11 and at the left (in FIG. 1) of the cylinder 12 with a bore 14 having a diameter larger than that of the cylinder 12 and a threaded portion at the end of the bore. On the inner peripheral surface of the cylinder 11 there are provided ring-shaped recesses 15, 16 and 17 separated from each other. Between the cylinder 12 with smaller diameter and the bore 14 there is formed a ring-shaped valve seat surface 18 inclined in a predetermined angle with respect to the axis of the cylinder. At the portion where the inner surface of the cylinder 12 and the valve seat surface 18 cross each other there is formed a ring-shaped edge 19 as shown in FIG. 2.

Figure 3:
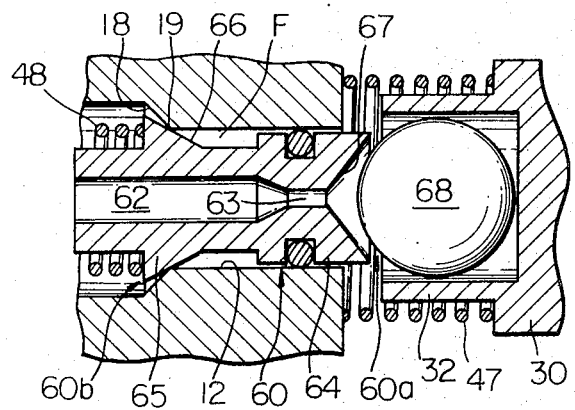
FIG. 3 is an enlarged fragmentary sectional view of the fluid pressure control valve apparatus of FIG. 1 showing the details of the second valve.

Within the cylinder 11 there is slidably fitted a cylindrical hollow seat piston 20. At the both ends and the intermediate portion on the outer peripheral surface of the seat member or the seat piston 20 there are provided lands 21a, 21b, and 21c and in the inside of the seat piston 20 there are provided axial bores 22 and 23 respectively having diameters different from each other as shown in FIG. 2. Between the bores 22 and 23, there is formed a valve seat surface 24 inclined in a predetermined angle with respect to the axis, and at the portion where the valve seat surface and the inner surface of the axial bore 22 cross each other there is formed a ring-shaped edge 25. The seat member or the seat piston 20 is further provided between the projections 21a and 21b with a plurality of openings 26 extending radially and communicating the bore 22 with the outside of the piston and between the lands 21b and 21c with a plurality of openings 27 extending radially and communicating the bore 23 with the outside of the piston. Into the end of the bore 23 of the seat piston 20 there is fitted a ring-shaped member 28 within which is slidably received a cylindrical portion 31 provided at one side of a holder 30. At the other side of the holder 30 there is provided a hollow cylindrical portion 32 within which is loosely held a ball 68 of a second valve 60 to be described hereinafter as shown in FIG. 3. At the center of the holder 30 there is provided a flange 35 extending radially and having a radial surface 34 for sealably contacting the end face of the seat piston 20. The region between the seat piston 20 and the inner surface of the cylinder with the larger diameter is sealed by means of known O-rings respectively provided within grooves on the outer peripheral surfaces of each land to prevent fluid from leaking therethrough.

Within the cylinder portion 13 there is slidably fitted a holder 35. At an end of the holder 35 there is provided a blind hole 36 extending axially and at the other end of the holder 35 there is provided a hollow cylindrical portion 37. Within the blink hole 36 there is received a push rod 41 with a cushion 40 held therebetween, and within the hollow cylindrical portion 37 there is loosely held a ball 58 of the first valve 50 to be described. The region between the inner peripheral surface of the cylinder portion 13 and the holder 35 is sealed by means of a known seal ring provided within ring-shaped groove 38 formed on the outer peripheral surface of the holder 35 to prevent fluid from leaking through.

Within the bore 22 of the seat piston 20 there is slidably fitted a valve spool 51 of the first valve 50. At the center of the valve spool 51 there is provided a hole or first passage 52 extending axially and having an orifice 53 at an end thereof. On the outer periphery of the valve spool 51 there are provided ring-shaped projections or lands 54 and 55 spaced from each other as shown in FIG. 2, and at the land 55 there is formed an inclined valve face 56 for sealably engaging the ring-shaped edge 25 of the seat piston. At an end (at the right hand end in FIG. 1) there is formed a cone-shaped valve seat surface 57 for sealably engaging a ball 58 received within the hollow cylindrical portion 37 of the holder 35. The region between the inner peripheral surface of the bore 22 and the valve spool is sealed by means of a known O-ring provided within the ring-shaped groove formed on the outer periphery of the valve spool to form a fluid tight seal.

The valve seat face 57 on the valve spool 51 and the ball 58 constitute a first normally open valve 50a between the reservoir tank and the wheel cylinder, while the valve face 56 of the valve spool 51 and the ring-shaped edge 25 on the seat piston constitute a first normally closed valve 50b between the source of fluid pressure and the wheel cylinder.

Within the cylinder 12 there is slidably fitted a valve spool 61 of a second valve 60. The valve spool 61 has the same construction as the valve spool 51 of the first valve 50. Namely, at the center of the valve spool 61, there is provided a hole or second passage 62 extending axially and having an orifice at an end, on the outer periphery of the valve spool 61 there are provided ring-shaped projections or lands 64 and 65 spaced from each other as shown in FIG. 3, at the land 65 there is formed a cone-shaped valve face 66 for sealably engaging the ring-shaped edge formed on the body, and at an end (at the right hand end in FIG. 1) there is formed a coneshaped valve seat face 67 for sealably engaging a ball 68 received within the hollow cylindrical portion 32 of the holder 30.

The valve seat face 67 on the valve spool 61 and the ball 68 constitute a second normally valve 60a between the reservoir tank and the wheel cylinder, while the valve face 56 and the ring-shaped edge 19 within the cylinder 12 constitute the second normally closed valve 60b between the source of fluid pressure and the wheel cylinder.

At the open end of the cylinder portion there is fitted a snap ring 42 within the ring-shaped groove to prevent the holder 35 from moving out of the cylinder portion. At the open end of the hole 14 there is screwed into an end cover 43.

Within the larger diameter cylinder a chamber (first chamber) A is defined between the seat piston 20 and the holder 35, and a chamber (third chamber) C is defined between the seat piston, the holder 30 and the valve spool 61. Within the seat piston a chamber (second chamber) B is defined between the holder 30 and the valve spool 51. Within the hole 13 a chamber (fourth chamber) D is defined between the end cover 43 and the valve spool 61. Further, within the bore 22 a chamber E is defined between the lands 54 and 55 of the valve spool 51 in FIG. 2, and within the cylinder with the smaller diameter a chamber F is defined between the projections 64 and 65 of the valve spool 61 in FIG. 3.

Within the chamber A there is provided biasing means or a spring 45 between the snap ring 44 fitted into the groove 17 and the holder 35. The spring 45 presses the holder 35 against the snap ring 42. Within the chamber B there is provided biasing means or a spring 46 between the holder 30 and the valve spool 51. The spring 46 biases the valve spool to the right to make the valve face 55 and the ring-shaped edge 25 engage with each other. Within the chamber C there is provided biasing means or a spring 47 between the flange 33 of the holder 30 and the body. The spring 47 presses the holder 30 against the seat piston. Further, within the chamber D there is provided biasing means or a spring 48 between the end cover 43 and the valve spool 61. The spring 48 biases the valve spool to the right so as to sealably engage the valve face 65 and the ring-shaped edge 19.

On the outer periphery of the body there are provided a port 70 communicating through a passage 70a with the chamber A, a port 71 communicating through a passage 71a with the ring-shaped groove 15 within the cylinder with larger diameter, a port 72 communicating through a passage 72a with the chamber C, and a port 73 communicating through a passage 73a with the chamber D. As is evident from FIG. 1, the chamber B can communicate with the port 71 through the hole 29, ring-shaped groove 15, and the passage 71a. The port 70 communicated with a reservoir tank (first reservoir tank) 80 through a pipe 74. The port 71 communicates with a wheel cylinder (first wheel cylinder) 82 through a pipe 76. The port 72 is communicated with a reservoir tank (second reservoir tank) 81 through a pipe 77. And the port 74 is in communication with a wheel cylinder (second wheel cylinder) 83 through a pipe 78. A pipe 75 connecting a port (not shown) communicating with the ring-shaped groove 16 to the reservoir tank 80 is provided with a pump 84 and a check valve 86 in series. The pipe 78 connecting a port (not shown) communicating with the chamber F to the reservoir tank 81 is provided with a pump 85 and a check valve 87 in series. The pipes 75 and 78 are connected respectively with first and second accumulators 88 and 89. The chamber E communicates with the pipe 75 through the hole 27 provided in the seat piston 20 and the ring-shaped groove 16.

The operation of the fluid pressure control valve apparatus for a dual brake system according to the present invention will now be described in connection with the attached figures.

When the brake pedal is depressed on to force the push rod 41 to the left in FIG. 1, the holder 35 is pushed through the cushion to the left. When the holder 35 moves to the left the ball 58 of the first valve 50 rests on the valve seat face 67 to cut off communication between the chambers A and B. As a result, the communication between the wheel cylinder 82 and the reservoir tank 81 is cut off. When the brake is further depressed to push the push rod further to the left, the valve face 56 of the valve spool 51 is separated from the edge 25 to thereby communicate the chamber B with the ring-shaped chamber E and further with the accumulator 88 through the hole 28 and the pipe 75. As a result, the pressure within the accumulator 88 is transmitted through the pipe 75, hole 28, and ring-shaped chamber E to the chamber B and increases there. The increased pressure is transmitted through the hole 27 of the seat piston, passage 71a, port 71 and pipe 76 to the wheel cylinder 82 to apply the brake.

On the other hand, the increased pressure within the chamber B presses the holder 30 to the left (in FIG. 1) against the biasing force of the spring 47 to make the ball 68 rest on the valve seat face 67 formed on the valve spool 61. When the ball rests on the valve seat face, the communication between the chambers C and D through the hole 62 of the valve spool is cut off to thereby cut off the communication between the pipes 77 and 78. When the holder 30 is further pushed to the left, the valve spool 61 is also pushed together and the valve face 66 thereof is separated from the ring-shaped edge 28 to thereby communicate the chamber D with the ring-shaped chamber F. As a result, the fluid from the accumulator 89 is transmitted through the pipe 78 and ring-shaped chamber F to the chamber D and further through the port 73 and pipe 75 to the wheel cylinder to apply brake.

The brake is applied through the steps described above. In the control valve of this embodiment, after the brake pedal is depressed to slide the valve spool 51 to the left and until the valve face 56 is opened and the pressure within the chamber B is increased, the required pedal thread force is only the sliding resistance of the valve spool 51 and the set load of the return springs 45 and 46. The valve spool 51 has small diameter and the sliding resistance thereof is, accordingly, small.

Figure 4:
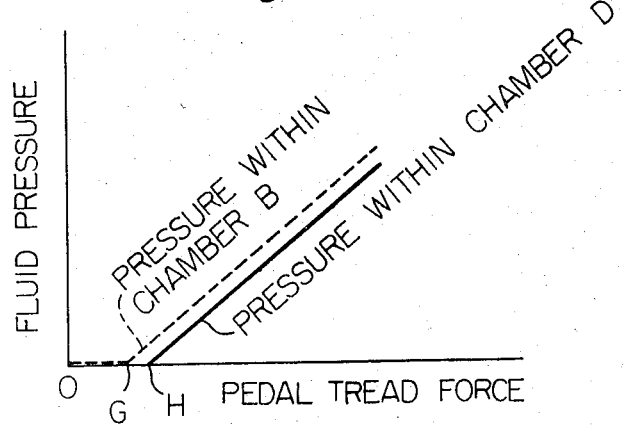
FIG. 4 is a graphical expression of the relation between the output fluid pressure and the pedal tread force of the fluid pressure control valve apparatus shown in FIG. 1.

As shown in FIG. 4 wherein the ordinate axis shows the fluid pressure at the wheel cylinder side and the abscissa axis shows the pedal tread force, the tread force required to start increasing the pressure within the chamber B is indicated by OG, and after the tread force reached OG the pressure within the chamber B increases as shown by dotted line in FIG. 4. Then, the fluid pressure from the accumulator 88 is transmitted to the chamber B in proportion to the pedal tread force, and the holder 30 is moved to the left by the fluid pressure so that the pressure within the chamber D begins to increase. The pedal tread force required at this time is the sliding resistance of the holder 30 and the valve spool 61 plus the set load of the springs 47 and 48 amounting to OH which is somewhat larger than OG. Thereafter, as the pedal tread force increases, the pressure within the chamber D increases as indicated by the solid line in FIG. 4. With the pedal stroke described heretofore, the seat piston 20 remains stationary. The brake of the normal time works with the seat piston 20 remaining still. In other words, the brake begins to work while the OG or OH is substantially small. Therefore, the dead zone of the brake can be reduced to secure safety in the braking operation.

Moreover, during the braking operation, the fluid pressure from the reservoir tank 88 acting onto the section of the valve spool 51 in the right in FIG. 1 is felt by the operator with his foot to facilitate the control of braking operation.

When the accumulator 88 is not accumulated by any cause, if the brake pedal is stepped on, the holder 35 is moved to the left until the left end thereof comes into contact with the right end of the seat piston 20 whereby the holder 30 at the left hand side is pushed to the left and the fluid pressure from the accumulator 89 only acts upon the wheel cylinder 83 to perform damping.

On the contrary to the above, when the accumulator 89 is in non-operable condition caused by some irregularity, if the pedal is stepped on and the valve spool 51 at the right hand side operates normally to transmit the fluid pressure of the accumulator 88 to the chamber B, the holder 30 at the left hand side is moved to the left until the left end thereof comes into contact with the left inner side surface of the cylinder 11, and then the fluid pressure within the chamber B increases normally and the fluid pressure within the wheel cylinder 82 increases to perform the braking operation. Thus, safety in braking operation can be achieved.

In the construction described above, the fluid pressures of the two brake systems can be maintained equal to each other by making the sliding diameter of the holder 30 the same as that of the valve spool 51.

Alternately, the fluid pressures of the two systems can be made different from each other by making the diameters of the holders different from each other or by making the diameters of the valve spools different from each other.

Figure 5:
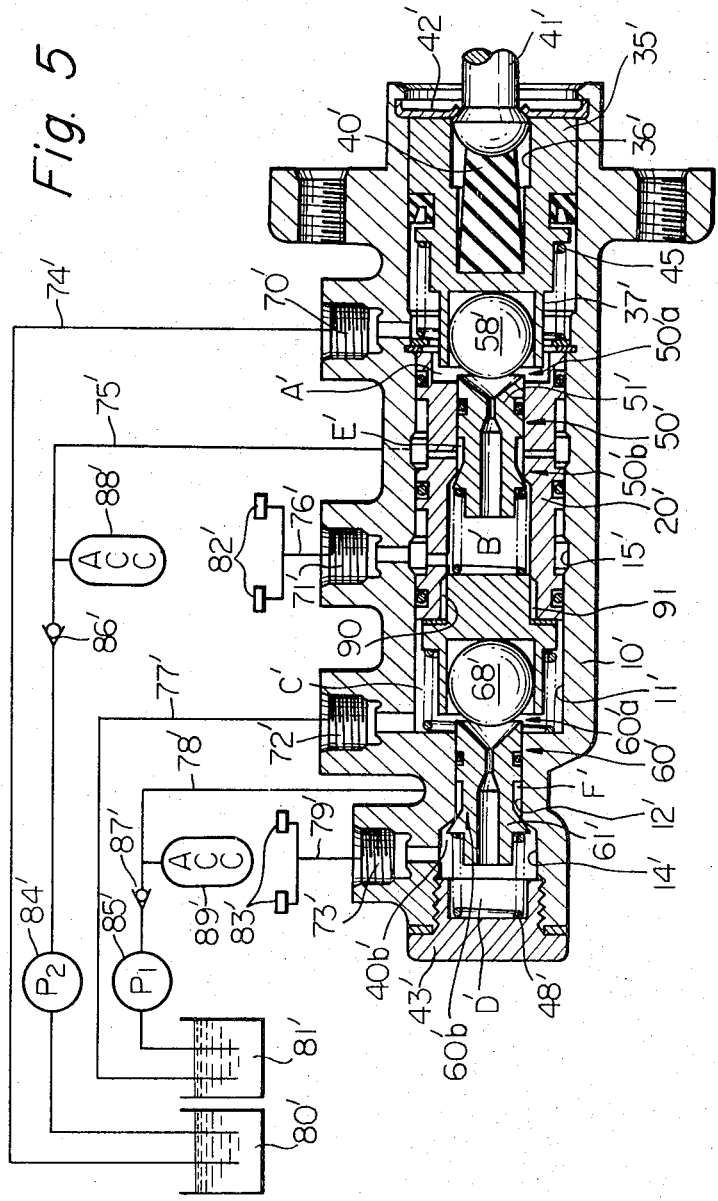
FIG. 5 is a longitudinal sectional view of the second embodiment of the fluid pressure control valve apparatus for a dual system brake according to the present invention; and, FIG. 6 is a graphical expression of the relation between the output fluid pressure and the pedal tread force of the fluid pressure control valve apparatus shown in FIG. 5.

In FIG. 5, there is shown another embodiment of the fluid pressure control valve apparatus for a dual brake system according to the present invention. In this embodiment, main parts corresponding to parts of the first embodiment are denoted by the same reference numeral with the addition of a prime (').

The controlling apparatus of the second embodiment differs from that of the first embodiment only in that into a thread 90 provided at the open end of the bore 23' of the seat piston 20' is screwed a thread 91 provided at the outer periphery of the cylindrical portion 31' of the holder 30' so that the seat piston 20' and the holder 30' can be moved together as one unit. However, in other structural and functional features, the second embodiment is substantially the same as the first embodiment. Accordingly, further explanation of the construction is omitted.

Since the holder 30' cannot move relative to the seat piston 20', even when the valve face 56' is separated from the edge 25' to increase the pressure within the chamber B', the holder 30' cannot move independently but moves with seat piston 20'. Accordingly, after the left hand end of the hollow cylindrical portion of the holder 35' comes into contact with the right hand end of the seat piston 20', when the brake pedal (not shown) is further depressed to push the push rod 41' to the left, the holder 35', the seat piston 20' and the holder 30' move together to the left whereby the ball 68' rests on the valve seat face 67' on the valve spool 61' to cut off the communication between the chambers C' and D'.

Figure 6:
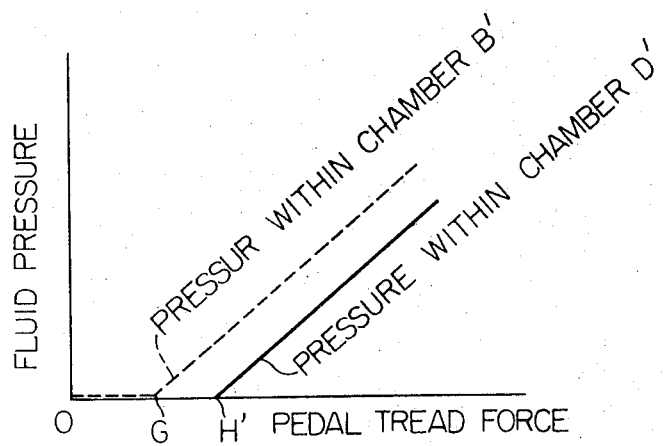

Since the holder 30' and the seat piston 20' are connected together as one unit, the relation between the pedal thread force and the output oil pressure is as shown in FIG. 6. Namely, the pressure within the chamber B' begins to increase at the pedal tread force OG as in the first embodiment and thereafter continues to increase as shown by the dotted line in FIG. 6. However, since the seat piston 20', too, must be moved before the pressure within the chamber D' begins to increase, the pedal tread force OH' required for beginning to increase the pressure within the chamber D' is larger than the pedal tread force OH in the first embodiment. The seat piston 20' of the second embodiment can slide not only in the normal condition but also in the abnormal condition.

However, since in both embodiments sufficient output pressure can be obtained by relatively small pedal tread force, in other words, since the dead zone of the brake is small, the braking operation is now safer than before due to the present invention.

We claim:

1. A fluid pressure control valve apparatus for a dual brake system for operating two systems of brake assemblies having first and second sources of fluid pressure and first and second wheel cylinders simultaneously or separately in response to tread force applied to a brake pedal, comprising:

a body having a cylinder with a larger diameter and a cylinder with a smaller diameter;

a hollow seat piston slidably received within said cylinder with a larger diameter;

a first valve means having a valve spool slidably received within said hollow seat piston, said valve means respectively further having a normally open valve member interposed in a communicating channel connecting a first reservoir tank and said first wheel cylinder for controlling communication therebetween, and a normally closed valve member interposed in a communication channel connecting said first source of fluid pressure and said first wheel cylinder for controlling communication therebetween; and a second valve means having a valve spool slidably received within said cylinder with a smaller diameter and having a normally open valve member interposed in a communication channel between a second reservoir tank and said second wheel cylinder for controlling communications therebetween and a normally closed valve member interposed in a communications channel between said second source of fluid pressure and said second wheel cylinder for controlling communications therebetween;

said normally closed valve members of said first and second valve means respectively constituted by a valve face formed on the outer periphery of the corresponding valve spool and an annular portion formed on the inner periphery of said cylinder with a smaller diameter, said valve spool of said first valve means receiving the brake reaction force within said seat piston when said first wheel cylinder is in communication with said first source of fluid pressure, and said second valve means being operated by fluid pressure produced by the operation of said valve spool of said first valve means.

2. A fluid pressure control valve apparatus for a dual brake system as recited in claim 1, wherein said first valve means has a holder and a ball supported within said holder which is slidably received within said cylinder of a larger diameter and said second valve means has a holder and a ball supported within said holder which is disposed between said seat piston and said valve spool of said second valve means.

3. A fluid pressure control valve apparatus for a dual brake system according to claim 2, wherein said normally open valve member of said first valve means is constituted by a conical valve seat face provided on the corresponding valve spool and the corresponding ball, and said normally open valve member of said second valve means is constituted by a conical valve seat face provided on the corresponding valve spool and the corresponding ball.

4. A fluid pressure control valve apparatus for a dual system brake according to claim 3, said apparatus further comprising, a biasing means provided between said valve spool of said first valve means and said holder for supporting said ball of said second valve means and for normally sealably engaging said valve face of said second valve member on said valve spool of said first valve means and said second annular portion on said seat piston, and a biasing means provided between said valve spool of said second valve means and a cover member for normally sealably engaging said valve face on said valve spool of said second valve and said annular portion on the inner periphery of said cylinder.

5. A fluid pressure control valve apparatus for a dual system brake according to claim 3, wherein said holder for supporting said ball of said second valve is slidably received within said seat piston.

6. A fluid pressure control valve apparatus for a dual system brake according to claim 3, wherein said holder for supporting said ball of said second valve is fixed to said seat piston.

7. A fluid pressure control system for a dual brake system including brake means, first and second sources of fluid pressure, first and second wheel cylinders, first and second reservoir tanks and a fluid pressure control valve apparatus including first and second valves, which fluid pressure control valve apparatus includes a housing having a cylinder of larger diameter and a cylinder of smaller diameter a holder slidably fitted within said cylinder or larger diameter and holding a ball of said first valve operable in response to said brake means, a seat piston slidably fitted within said cylinder of larger diameter, a valve spool of said first valve slidably fitted within said seat piston, a first chamber defined by said holder of said first valve and said valve spool of said first valve and communicating with said first reservoir tank, a holder slidably provided within said cylinder of larger diameter and holding a ball of said second valve, a second chamber defined by said holder of said second valve and said valve spool of said first valve and communicating with said first wheel cylinder and said first reservoir tank, a valve spool of said second valve slidably fitted within said cylinder of smaller diameter a third chamber defined by said valve spool of said second valve and said holder of said second valve and communicating with said second wheel cylinder, a first normally-closed valve formed by said valve spool of said first valve and said seat piston interposed between said first reservoir tank and said second chamber for controlling communication therebetween, a first passage formed in said valve seat of said first valve and communicating between said first and second chambers, a second passage formed in said valve spool of said second valve and communicating between said third chamber and a fourth chamber, defined by the valve spool of said second valve and an end cover, and a normally closed valve formed by said valve spool of said second valve and an inner wall of said housing and controlling the communication between said second reservoir tank and said fourth chamber;

said ball and said valve spool of said first valve cooperating with each other to control the communication between said first and second chambers;

the pressurized fluid within said second chamber increased in pressure by the operation of said valve seat of said first valve acting upon said brake means;

said ball and said valve spool of said second valve cooperating with each other to control the communication between said third and fourth chambers;

the pressurized fluid within said second chamber activating said second valve spool through said ball of said second valve whereby the fluid pressure within said fourth chamber is increased.

8. A fluid pressure control system for a dual brake system according to claim 7, wherein a pressing member is provided between said seat piston and said holder of said second valve.

9. A fluid pressure control system for a dual brake system according to claim 7, wherein said seat piston and said holder of said second valve are threadably engaged to cooperate with each other.

10. A fluid pressure control system for a dual brake system as recited in claim 7, wherein, when said first source of fluid pressure is damaged, said holder of said first valve activates said seat piston in response to said brake means whereby said holder of said second valve is moved to increase the fluid pressure from said second source of fluid pressure within said fourth chamber.

11. A fluid pressure control system for a dual brake system according to claim 10, wherein, when said second source of fluid pressure is damaged, said holder of said first valve, in response to said brake means cooperates with said ball of said first valve to activate said valve spool of said first valve whereby said holder of said second valve is positioned against said wall formed in said cylinder of larger diameter, and thereafter the fluid pressure from said first source of fluid pressure within said second chamber is increased.

* * * * *